United States Patent [19]

Suzuki et al.

[11] Patent Number: 4,866,695
[45] Date of Patent: Sep. 12, 1989

[54] ACCESS CONTROL SYSTEM FOR ROTATING AN INFORMATION STORAGE DISC AT A CONSTANT LINEAR VELOCITY

[75] Inventors: Motoyuki Suzuki; Yoshio Miura, both of Yokohama, Japan

[73] Assignee: Hitachi, Ltd., Tokyo, Japan

[21] Appl. No.: 100,234

[22] Filed: Sep. 23, 1987

[30] Foreign Application Priority Data

Sep. 24, 1986 [JP] Japan ................... 61-225328

[51] Int. Cl.⁴ ..................... G11B 17/06; G11B 19/24
[52] U.S. Cl. ............................ 369/266; 369/267; 369/240
[58] Field of Search ............. 369/266, 267, 50, 54, 369/58, 240, 243

[56] References Cited

U.S. PATENT DOCUMENTS

| | | | |
|---|---|---|---|
| 4,079,942 | 3/1978 | Kunen | 369/266 |
| 4,223,349 | 9/1980 | Dakin et al. | 358/128.5 |
| 4,450,552 | 5/1984 | Marcantonio | 369/240 |
| 4,530,083 | 7/1985 | Ishihara | 369/240 |
| 4,750,055 | 6/1988 | Van et al. | 369/240 |
| 4,757,488 | 7/1988 | Nagai et al. | 369/240 |

FOREIGN PATENT DOCUMENTS 57-55563  4/1982  Japan .
60-19367  1/1985  Japan .

*Primary Examiner*—Steven L. Stephan
*Attorney, Agent, or Firm*—Antonelli, Terry & Wands

[57] ABSTRACT

In a control system for a disc player for a CLV (constant linear velocity) type disc, in order to control a rotation of a spindle motor in response to a location of the disc to be read, there is provided a tachometer coupled to the motor for generating a rotation signal having a frequency corresponding to a rotation of the motor, signal generator for generating a reference signal having a frequency corresponding to the rotation suitable to the location to be read, and a drive circuit for controlling the rotation of the motor so that rotation is effected in accordance with the reference signal.

8 Claims, 3 Drawing Sheets

ACCESS CONTROL SYSTEM FOR ROTATING AN INFORMATION STORAGE DISC AT A CONSTANT LINEAR VELOCITY

BACKGROUND OF THE INVENTION

The present invention relates to an access control system for rotating an information storage disc at a variable angular velocity or at a constant linear velocity.

An example of such a disc of a constant linear velocity type is disclosed in U.S. Pat. No. 4,223,349 and examples of control systems are disclosed in the U.S. Pat. No. 4,223,349 and Japanese laid open Patent No. 193167/1985. The access control system disclosed in the Japanese laid open Patent includes, in order to move compulsively the optical transducer in the radius direction, a pickup location detector for detecting a location of an optical transducer on the radius axis, the optical transducer being movable in the radius direction to pickup the information from the rotating disc, and a divider circuit for producing a rotation number in response to a detection signal from the pickup location detector. Conventional divider circuits are complicated and highcost products. Further, a potentiometer whose slider terminal is coupled to the optical transducer is used for the pickup location detector, so it is required to be highly precise in assembling and adjusting the pickup location detector.

SUMMARY OF THE INVENTION

It is an object of the present invention to provide a access control system for a disc player without such a divider circuit and a potentiometer.

In order to achieve the above object there is provided reference means for producing a reference signal presenting a rotation frequency of a spindle motor coupled to a disc, detector means for detecting the rotation frquency of said spindle motor, comparing means for producing a difference signal between said reference signal and a detection signal from said detector means to produce an error signal, and control means connected to said comparing means and said spindle motor for controlling the rotation of said spindle motor so that said error signal is minimized, whereby said spindle motor can rotate at said rotation frequency.

DESCRIPTION OF THE PREFERRED EMBODIMENTS

Figure 1:
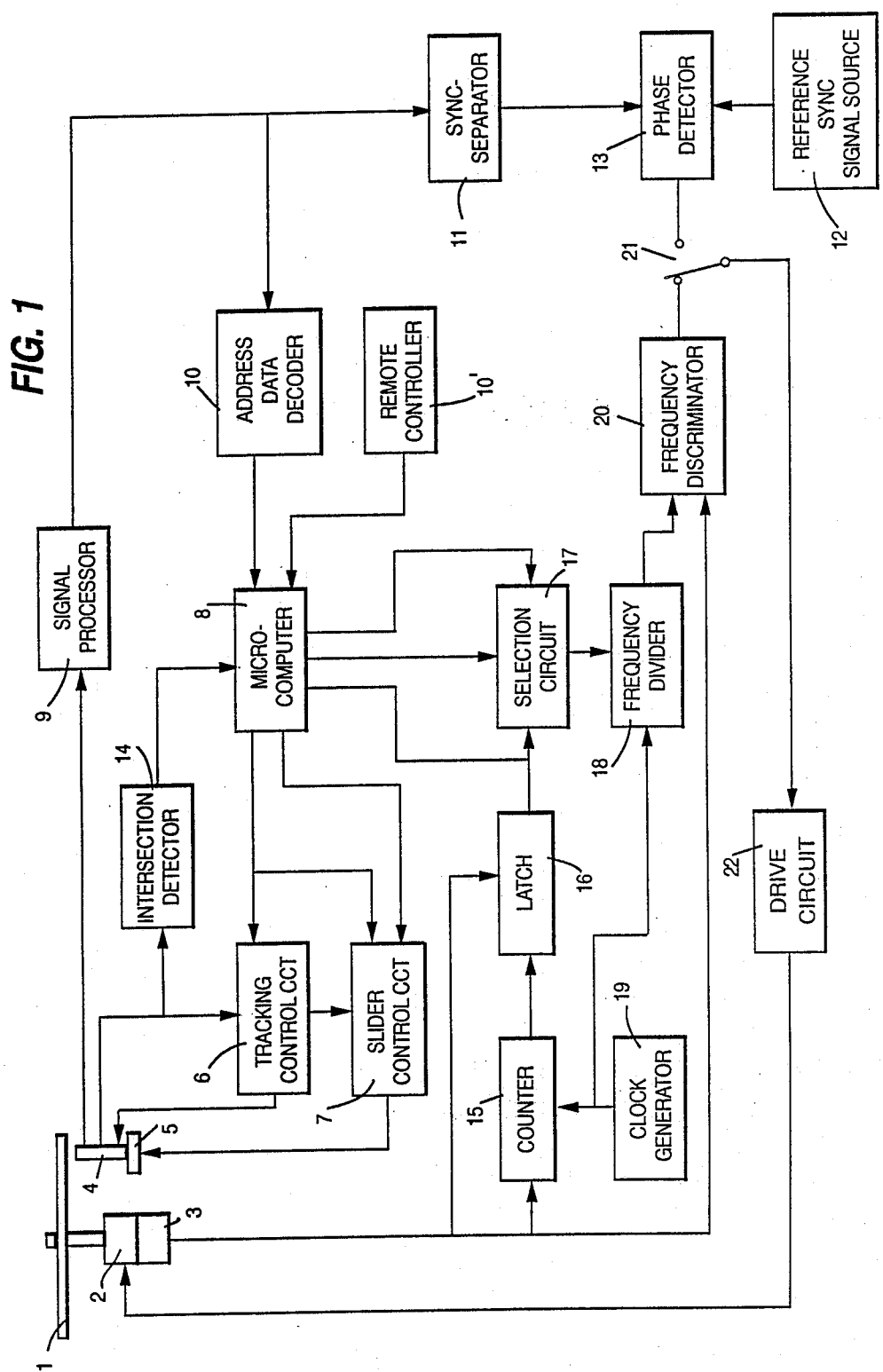
FIG. 1 is a block diagram showing one embodiment of the present invention.

In FIG. 1, disk 1 which is a constant linear velocity (CLV) type, i.e. a variable angular velocity type is coupled to a rotor of spindle motor 2 which is controlled by drive circuit 22. Tachometer 3 is also coupled to spindle motor 2 to produce a tachometer signal whose frequency is proportional to its angular velocity. Optical transducer 4 for receiving a laser beam which is traced along an information track and reflected at a surface of disc 1 to produce an electrical signal is mounted on slider 5 which is movable radially relative to disc 1. Signal processor 9 produces from the received electrical signal a composite video signal which is supplied to sync separator 11 and a data signal which is supplied to address data decoder 10. Tracking correction made by tracking control circuit 6 which responds to an error signal shown in FIG. 5 and slider control circuit 7 which responds an output signal from tracking control circuit 6 if ON/OFF signal (a) from micro-computer 8 is "ON" and an address signal presenting a number of the track to be traced from micro-computer 8 if ON/-OFF signal (a) is "OFF". Microcomputer 8 receives the address signal from data decoder 10 and remote controller 10′ and also receives a track detection signal which is generated at track detector 14 when the laser beam focused onto the surface of disc 1 intersects any of information tracks.

Since the tachometer signal comprises a fixed number of pulses in one rotation of the rotor of motor 2, the frequency of the rotation of motor 2 can be obtained by measuring the time period between adjacent pulses from tachometer 3. Counter 15 counts a number of clock pulses supplied thereto from clock generator 19, the frequency of clock pulses being much higher than that of the tachometer signal, and latch circuit 16 holds the counted number for clock pulses at one pulse from tachometer 3 till the next pulse succeeding the one pulse in the tachometer signal. Selection circuit 17 selects one of latched signal (d) and data signal (e) from micro-computer 8 in response to selection signal (c) and supplies the selected signal to frequency divider 18 for generating a reference signal which is compared with the tachometer signal at frequency discriminator 20.

In normal play operation, drive circuit 22 is coupled to phase detector 13 through switch 21, consequently the rotation of spindle motor 2 is controlled so that the phase of a line frequency of the reproduced video signal from signal processor 9 is in accord with the phase of a reference line sync signal generated at reference sync siganal source 12.

In order to understand the access (search) operation, basic matters in the disc player of CLV type will be explained.

Figure 4:
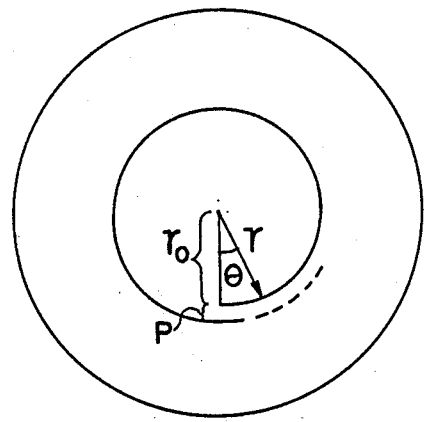
FIG. 4 is a diagram showing the shape of an imformation track of a disc.

Referring to FIG. 4, r0 represent a radius of the innermost information track (i.e. a distance btween the center and the location in which the first information is stored in the disc), f0 the rotation frequency when the innermost track is traced by transducer 4, t time duration required for transducer 4 to reach the location of radius r from the first location of radius r0, P track pitch, and $\theta$ angular between the location from which reproducing operation is started and the location of radius r0. Since the track is spiral, and $P < < r0$, the track length L0 for the innermost track reproduced by one rotation of disc 1 is expressed by the following equation.

$$L0 = \int_0^{2\pi} \{(P\theta/2\pi) + r0\}d\theta \quad (1)$$

Since the linear velocity is constant in this case, the track length L reproduced for the time t is expressed as follows.

$$L = L0 f0 t \quad (2)$$

On the other hand, the number N of rotation of disc 1 for the time t is expressed as follows.

$$N = (r/r0)/P \tag{3}$$

Therefore a following equation is obtained by the above equations.

$$L = \int_0^{2\pi N} \{(P\theta/2\pi) + r0\} d\theta \tag{4}$$

From these equations (1)-(4), the radius r of the location produced at the time t after the reproducing operation has been started is expressed as follows.

$$r = \sqrt{r0^2 + Pf0\, t\, (p + 2r0)} \tag{5}$$

Therefore the radius r of the location to be reproduced after the time t from the first location of the radius r0 is calculated according to the equation (5).

If it is assumed that the period of the tachometer signal when the location of the radius r of disk 1 is reproduced is Tr, the following equation is obtained, since the frequency of the tachometer signal is proportional to the rotation frequency f of disc 1.

$$f = K/Tr = V/2\pi r \tag{6}$$

where

K is a proportion constant, and

V is a linear velocity of disc 1

Therefore the relationship among the period Tr of the tachometer signal, the frequency fclk of the clock pulse from clock generator 19 and the count value Cr output from counter 15 is defined by the following equation.

$$Tr \approx Cr/fclk \tag{7}$$

Accordingly the count value Cr at counter 15 is proportional to the period Tr, that is, to the radius r of the reproduced track.

If is ia assumed that the count value for the innermost track ($r = r\theta$) is $C\theta$, the count value Cr for the track of the radius r is expressed as follows.

$$Cr = C0 r/r0 \tag{8}$$

Figure 2:
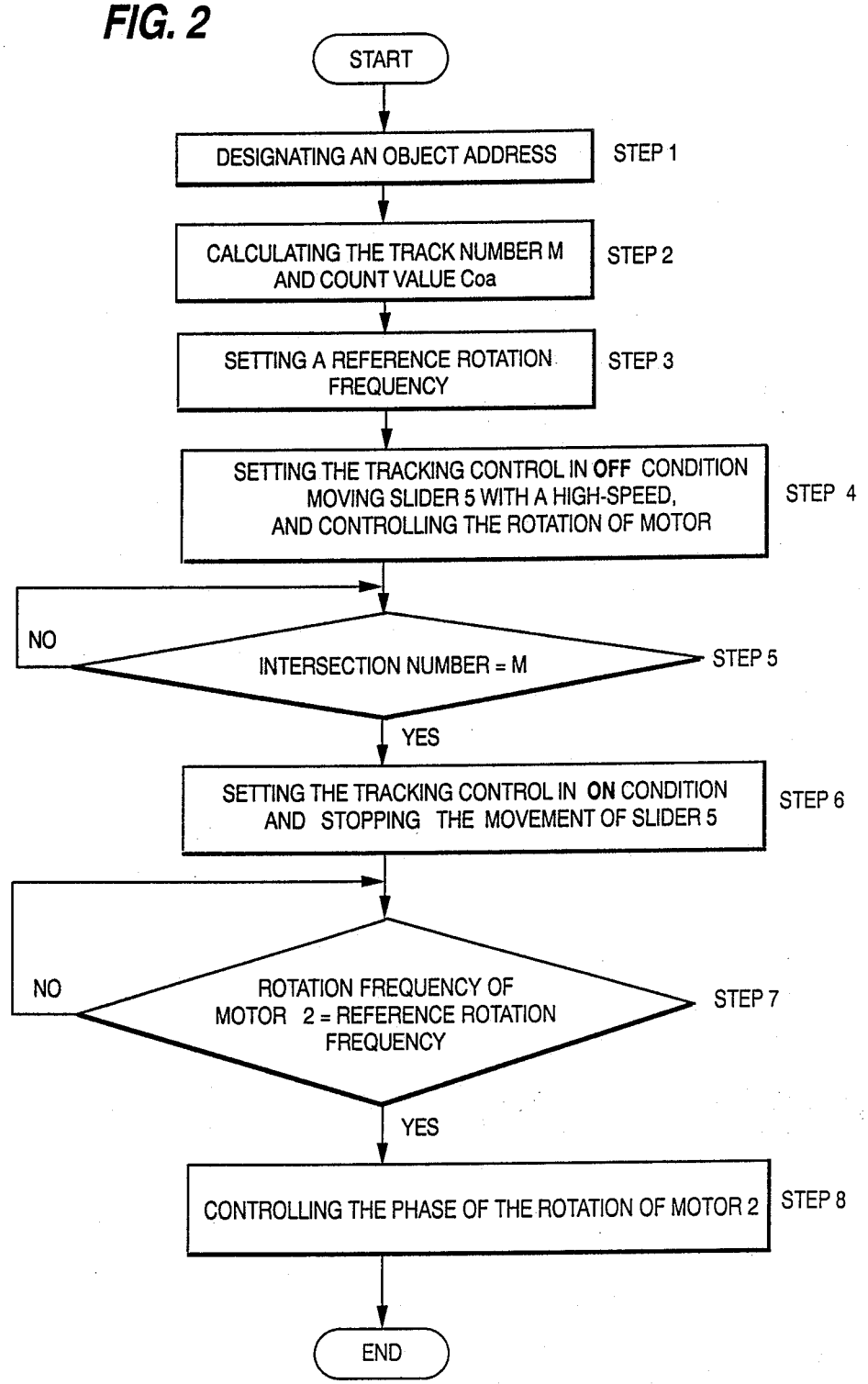
FIG. 2 is a flow chart showing the operation of the microcomputer in the embodiment shown in FIG. 1.

Referring now to FIGS. 1 and 2, the access opration in which the output of frequency discriminator 20 is coupled to drive circuit 22 through switch 21 will be explained.

An object address from which the reproducing operation is to be started is supplied to micro-computer 8 from remote controller 10' in step 1. In step 2 micro-computer 8 receives a current address at which the stored information is being read from address data decoder 10 and calculates the difference in the track number between the track roa containing the object address and the track rca containing the current address and determines the direction in which slider 5 is to be moved. The current address and the object address are given by the reproduced time from the first location, and if they are assumed to be tca and toa, respectively, the difference $\Delta r$ between the tracks roa and rca is obtained by the following equation.

$$\Delta r = roa - rca = \sqrt{r0^2 + Pf0\, toa\, (P + 2r0)} - \sqrt{r0^2 + Pf0\, tca\, (P + 2r0)} \tag{9}$$

Therefore the track number M from the track rca to the track roa is $$M = \Delta r/P \tag{10}$$

Also the direction for slider 5 to be moved is defined according to a sign of M. Further the count number Coa at the object address is expressed as follows by equations (5) and (9).

$$Coa = C0\, rca/r0 = \sqrt{r0^2 + Pf0\, t0\, (P + 2\, r0)}\, /r0 \tag{11}$$

Figure 5:
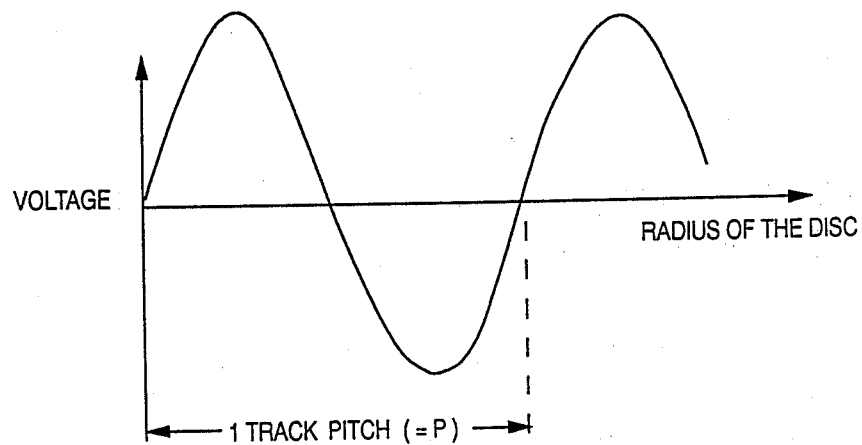
FIG. 5 is a diagram showing a waveform of an error signal.

After step 2 in which the track number M, the access direction and the count value Coa have been obtained by the calculation according to equations (10) and (11), micro-computer 8 provides the count value Coa to frequency divider 18 through selection circuit 17 which responds to selection signal (c) and data signal (e). Frequency divider 18 divides the clock pulse in response to the count value Coa to produce the reference frequency signal which is compared with the tachometer signal (step 3). In step 4 micro-computer 8 supplies OFF signal (a) to tracking control circuit 6 and slider control circuit 7 in order to cause these circuits 6 and 7 to be nonresponsive to error signal (f) and supplies movement signal (b) to slider control circuit 7 in order to move slider 5 with the high-speed toward the object address. Since frequency discriminator 20 produces a difference signal and supplies it drive circuit 22 to cause the frequency of the tachometer signal to be equal to the reference frequency signal in this step, the rotation frequency of motor 2 becomes the desired one corresponding to the count value Coa. Under the tracing-off condition, tracking error signal (f) is sinusoidal as shown in FIG. 5, in which one cycle is divided with the intersection of the track and the laser beam. Since intersection detector 14 produces one pulse at every time when the laser beam intersects the track, micro-computer 8 counts the generation of the pulse from intersection detector 14 and allows the movement of slider 5 till the number of the generation of the pulse becomes equal to the number M (step 5).

In step 6 after slider 5 reaches the object track including the object address, tracking ON/OFF signal (a) is changed to the ON signal from the OFF signal, so the tracking control responsive to error signal (f) is operative again. In step 7 micro-computer 8 compares the latched value from latch circuit 16 with the count value Coa. If both values are equal, micro-computer 8 turns over switch 21 so that the output of phase detector 13 controls drive circuit 22, that is, that the normal reproducing operation occurs again (step 8).

Under the normal reproducing operation, if the reproduced video signal disappears owing to some troubles, microcomputer 8 supplies selection signal (c) to selection circuit 17 in order to supply the latched value to frequency divider 18 through selection circuit 17 and turns over switch 21 in order to couple with discriminator 20 and drive circuit 22. Therefore under the undesired condition the rotation of motor 2 is kept at the latest normal rotation to prevent the lock-out condition in which the rotation is uncontrollable and irregular. The latched value used for preventing the lock-out in the rotation control may be replaced with the count value Coa obtained according to equation (11) on the address information from decoder 10.

Figure 3:
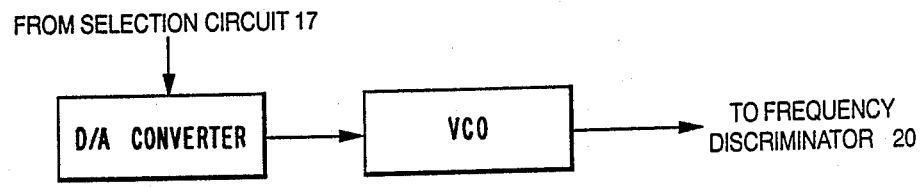
FIG. 3 is another block diagram for producing a reference signal.

Frequency divider 18 for generating the reference frequncy signal may be replaced with the circuit including D/A converter 23 for converting the data signal to an analog voltage and VCO 24 for producing a voltage controlled oscillation signal in response to the analog voltage from D/A converter 23 as shown in FIG. 3.

What is claimed is:

1. A control system for a disc player comprising:
   a motor for rotating a disc at a rotation frequency determined in accordance with a control signal supplied to a control terminal of said motor;
   tachometer means coupled to said motor for producing a tachometer signal having a frequency corresponding to the rotation of said motor;
   memory means for storing information data corresponding to said tachometer signal for different locations on said disc;
   frequency generating means for generating a reference signal having a frequency corresponding to said information data;
   comparing means coupled to said tachometer means and said frequency generating means for generating an output signal in response to a difference in frequency between said tachometer signal and said reference signal; and
   supply means for supplying said output signal as said control signal to said control terminal of said motor so as to enable rotation of said disc by said motor at a frequency corresponding to said information data;
   wherein said frequency generating means includes a clock generator providing clock signals to a counter and to a frequency divider, said counter being responsive to said clock signals from said clock generator for counting said clock signals in accordance with said tachometer signal and latch means for holding the count of said counter, the latch means supplying an output thereof to said frequency divider in accordance with a selection signal for enabling generation of said reference signal.

2. A control system according to claim 1 wherein said disc has an information track, and further comprising reproducing means for reproducing a signal from said information track and providing an output indicative thereof, said supply means responsive to said reproduced means output for supplying the output during normal play of said disc player as said control signal to said control terminal of said motor, said supplying means including means responsive to the loss of the output of the reproducing means during normal play of said disc player for supplying said output signal of said comparing means as said control signal to said control terminal of said motor for preventing lock-out of rotation control of said disc player.

3. A control system for a disc player comprising:
   a motor for rotating a disc at a rotation frequency determined in accordance with a control signal supplied to a control terminal of said motor;
   tachometer means coupled to said motor for producing a tachometer signal having a frequency corresponding to the rotation of said motor;
   memory means for storing information data corresponding to said tachometer signal for different locations on said disc;
   frequency generating means for generating a reference signal having a frequency corresponding to said information data;
   comparing means coupled to said tachometer means and said frequency generating means for generating an output signal in response to a difference in frequency between said tachometer signal and said reference signal; and
   supply means for supplying said output signal as said control signal to said control terminal of said motor so as to enable rotation of said disc by said motor at a frequency corresponding to said information data;
   wherein said disc has an information track, and further comprising reproducing means for reproducing a signal from said information track and providing an output indicative thereof, said supply means responsive to said reproduced means output for supplying the output during normal play of said disc player as said control signa to said control terminal of said motor, said supplying means including means responsive to the loss of the output of the reproducing means during normal play of said disc player for supplying said output signal of said comparing means as said control signal to said control terminal of said motor for preventing lock-out of rotation control of said disc player; and
   wherein said reproducing means includes means for separating a sync signal contained in an information signal from said information track of said disc, sync-signal source means for providing a reference sync-signal, phase detector means for producing a signal in response to a phase different between said sync-signal from said information signal and said reference sync-signal, said supply means including switch means having a common terminal connected to said control terminal of said motor, one input terminal connected to an output of said phase detector means and another input terminal connected to an output of said comparing means.

4. A control system according to claim 3, wherein said frequency generating means includes a clock generator providing clock signals to a counter and to a frequency divider, said counter being responsive to said clock signals from said clock generator for counting said clock signals in accordance with said tachometer signal and latch means for holding the count of said counter, the latch means supplying an output thereof to said frequency divider in accordance with a selection signal for enabling generation of said reference signal.

5. A control system for a disc player comprising:
   a motor for rotating a disc on which an information signal together with a sync-signal is recorded along an information track at a rotation frequency corresponding to a control signal supplied to a control terminal of said motor;
   reproducing means for reproducing said information signal from said disc;
   sync-separating means for separating said sync-signal from said reproduced information signal;
   a reference signal source for generating a reference signal of the sync-signal frequency;

phase detecting means coupled to said sync-separating means and said reference signal source for generating a phase error signal between said separated sync-signal and said reference signal;

tachometer means coupled to said motor for generating a tachometer signal having a frequency corresponding to the rotation frequency of said motor;

holding means for holding a frequency signal indicative of said tachometer signal until a succeeding tachometer signal is supplied thereto;

frequency discriminating means coupled to said holding means and said tachometer means for generating a frequency error signal of a frequency between said frequency signal held by said holding means and said succeeding tachometer signal;

drop-out detection means for detecting whether said separated sync-signal is present; and drive means for supplying said control terminal of said motor with said phase error signal when said separated sync-signal is present and for supplying said control terminal of said motor said frequency error signal when said separated sync-signal is not present.

6. A control system according to claim 5, wherein said holding means includes a clock generator providing clock signals to a counter and to a frequency divider, said counter being responsive to said clock signals from said clock generator for counting said clock signals in accordance with said tachometer signal and latch means for holding the count of said counter, said latch means supplying an output thereof to said frequency divider in accordance with a selection signal for enabling generation of said reference signal.

7. A control system according to claim 6, wherein said drive means includes switch means having a common terminal connected to said control terminal of said motor, one input terminal connected to an output of said phase detecting means and another input terminal connected to an output of said frequency discriminating means.

8. A control system according to claim 5, wherein said drive means includes switch means having a common terminal connected to said control terminal of said motor, one input terminal connected to an output of said phase detecting means and another input terminal connected to an output of said frequency discriminating means.

* * * * *